(12) United States Patent
Li et al.

(10) Patent No.: US 12,394,042 B2
(45) Date of Patent: Aug. 19, 2025

(54) PROVINCIAL-SCALE PREDICTION METHOD OF WINTER WHEAT GRAIN PROTEIN CONTENT

(71) Applicant: SHANDONG UNIVERSITY OF SCIENCE AND TECHNOLOGY, Qingdao (CN)

(72) Inventors: Zhenhai Li, Qingdao (CN); Xiaobin Xu, Qingdao (CN); Hongchun Zhu, Qingdao (CN); Lili Zhou, Qingdao (CN); Jibin Xu, Qingdao (CN); Shizhe Wei, Qingdao (CN); Xiaokang Zhang, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/790,827

(22) Filed: Jul. 31, 2024

(65) Prior Publication Data
US 2025/0209608 A1    Jun. 26, 2025

(30) Foreign Application Priority Data
Dec. 26, 2023   (CN) .......................... 202311800546.0

(51) Int. Cl.
*G06T 7/00* (2017.01)
(52) U.S. Cl.
CPC .... *G06T 7/001* (2013.01); *G06T 2207/30188* (2013.01)
(58) Field of Classification Search
None
See application file for complete search history.

(56) References Cited

U.S. PATENT DOCUMENTS

| 2016/0073573 A1* | 3/2016 | Ethington | G06Q 10/06 705/7.36 |
|---|---|---|---|
| 2023/0091677 A1* | 3/2023 | Brown | G06N 20/00 702/2 |

OTHER PUBLICATIONS

C. Xu, Xiaobin, et al. "Prediction of wheat grain protein by coupling multisource remote sensing imagery and ECMWF data." Remote Sensing 12.8 (2020): 1349, 21 pages, retrieved from the Internet on Nov. 14, 2024 (Year: 2020).*

(Continued)

*Primary Examiner* — Leon Viet Q Nguyen
(74) *Attorney, Agent, or Firm* — HAUPTMAN HAM, LLP

(57) ABSTRACT

A provincial-scale prediction method of a winter wheat grain protein content includes obtaining crop canopy spectral information of different spatial resolutions and spectral resolutions during a wheat growth period, performing pre-processing on the spectral information, performing feature selection based on pixel-wise phenology matching method, calculating, pixel by pixel, a maximal value of a spectral vegetation index within 90 days of each pixel maturity period, and selecting a vegetation index most highly correlated with the grain protein content for correlation analysis, and constructing a hierarchical linear model to perform prediction on the winter wheat grain protein content. In the present disclosure, the phenological difference of the relationship of remote-sensing information, climatic information and grain protein content is taken into account comprehensively, and pixel-wise phenology matching and hierarchical linear model are introduced, such that with key environmental factors as difference factors of the regional grain protein model.

2 Claims, 1 Drawing Sheet

(56) References Cited

OTHER PUBLICATIONS

First Office Action in Corresponding Chinese Application No. 202311800546.0, dated Feb. 6, 2024; 9 pgs.
Grant Notice in Corresponding Chinese Application No. 202311800546.0, dated Feb. 26, 2024; 3 pgs.
Search Report in Corresponding Chinese Application No. 202311800546.0, dated Feb. 2, 2024; 7 pgs.

* cited by examiner

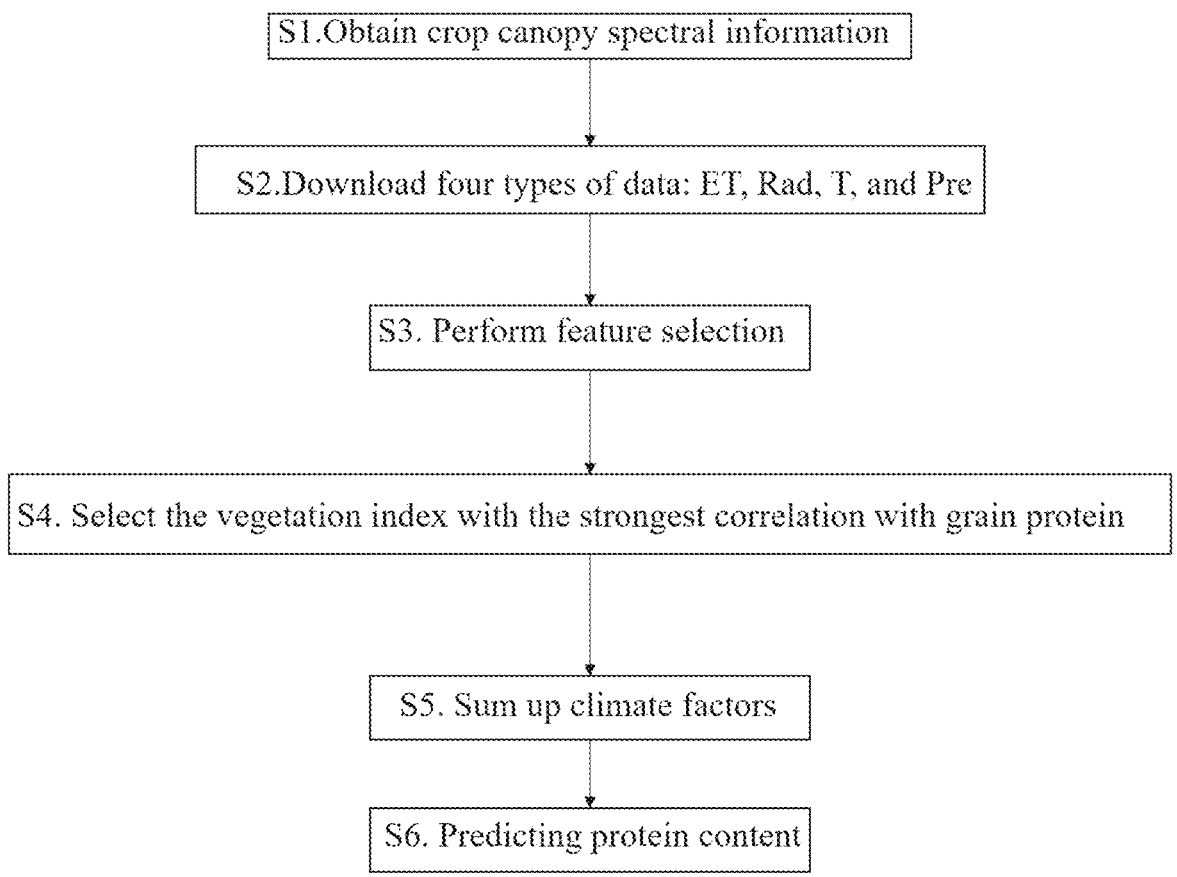

PROVINCIAL-SCALE PREDICTION METHOD OF WINTER WHEAT GRAIN PROTEIN CONTENT

RELATED APPLICATIONS

The present application claims priority from Chinese Application Number 202311800546.0 filed Dec. 26, 2023, the disclosure of which is hereby incorporated by reference herein in its entirety.

TECHNICAL FIELD

The present disclosure relates to the field of data prediction technologies and in particular to a provincial-scale prediction method of a winter wheat grain protein content.

BACKGROUND

The researches performed on crop protein content prediction based on remote-sensing technology can be mainly divided into four categories: empirical model with "remote-sensing information-grain protein content" mode, quantitative model with "remote-sensing information—agronomic parameter-grain protein content" mode, semi-mechanistic model of grain protein content based on remote-sensing information and ecological factors, and mechanism interpretation model based on remote-sensing information and crop growth model assimilation. More researches are performed on the former two models. These models are easy to operate and implement, but have poor mechanistic interpretability and large deviation in the inter-regional and inter-annual extended application process. Excessive input variables are considered in the assimilation model method and the problems of complex assimilation algorithm, appropriate quality growth model selection and localization and operation time limit the regional application of such methods. Therefore, The grain protein content prediction method combining remote-sensing information and ecological factors is developed such that the inter-annual and spatial heterogeneity and the semi-mechanistic model of remote-sensing information and grain protein content are considered based on the ecological factors, so as to provide a feasible solution for constructing a general grain protein content remote-sensing prediction model applicable to spatiotemporal extension.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

The FIGURE is an operational flow for a provincial-scale prediction method of a winter wheat grain protein content, according to at least one embodiment of the subject disclosure.

SUMMARY

The object of the present disclosure is to provide a provincial-scale prediction method of a winter wheat grain protein content so as to solve the problem of low protein content prediction accuracy in the prior arts.

There is provided a provincial-scale prediction method of a winter wheat grain protein content, which includes the following steps:

at step S1, obtaining crop canopy spectral information of different spatial resolutions and spectral resolutions during a wheat growth period, performing preprocessing on the spectral information, performing radiometric calibration, atmospheric correction and orthorectification based on satellite image data, and performing ratio conversion on ground canopy hyperspectra based on a reference white board of a target reflection intensity and a known reflectance to obtain a canopy reflectance;

at step S2, downloading four types of data of three months prior to a harvest period: daily evapotranspiration ET, radiation Rad, temperature T, and precipitation Pre, performing projection transformation on the four types of data to obtain raster data consistent with projection of the satellite image data in the step S1;

at step S3, performing feature selection based on pixel-wise phenology matching method, wherein the feature selection comprises selecting meteorological modeling feature and remote-sensing modeling feature;

at step S4, calculating, pixel by pixel, a maximal value of a spectral vegetation index within 90 days of each pixel maturity period, and selecting a vegetation index VI most highly correlated with the grain protein content for correlation analysis;

at step S5, selecting, pixel by pixel, climatic factors of three time periods prior to the maturity period for summation, wherein there are a total of 12 climatic factors which are components of the daily evapotranspiration ET, radiation Rad, temperature T, and precipitation Pre in respective three time periods;

using a summation result as a climatic feature of a nationwide wheat grain protein content prediction model;

at step S6, constructing a hierarchical linear model to perform prediction on the winter wheat grain protein content.

The step S3 includes the following steps:

at step S3.1, obtaining a phenological data set of nationwide wheat, matching the phonological data set with the raster data, dating forward three periods with each containing 30 days from the day of year of each pixel maturity period and within a total period of 90 days prior to the maturity period, with an interval of 30 days, calculating a cumulative value of each meteorological variable to obtain three cumulative values denoted respectively as T1, T2 and T3 and using T1, T2 and T3 as meteorological modeling features;

at step S3.2, selecting a maximal value of a remote-sensing variable of these 90 days as remote-sensing modeling feature.

The step S6 includes the followings:

a first layer of the hierarchical linear model is a linear model of grain protein content GPC and VI:

$$PC = \beta_o + \beta_1 \times VI + r;$$

wherein GPC is a grain protein content, r is a residual term of a first-layer model, $\beta_o$ is an intercept of the first-layer model, $\beta_1$ is a regression coefficient of the first-layer model.

The step S6 includes the followings:
values of the intercept and the regression coefficient are calculated by a second layer:

$$\beta_i = \gamma_{m0} + \sum_1^n (\gamma_{mn1} \times ET_n) + \sum_1^n (\gamma_{mn2} \times T_n) + \sum_1^n (\gamma_{mn3} \times Pre_n) + \sum_1^n (\gamma_{mn4} \times Rad_n) + \mu;$$

wherein $\beta_i$ is a value of the intercept or the regression coefficient, and i=0 or 1, $\gamma_{m0}$ is an intercept of a second-layer model, $\gamma_{mn1}, \gamma_{mn2}, \gamma_{mn3}, \gamma_{mn4}$ are regression coefficients of the second-layer model respectively, u is a residual term of the second-layer model, n is a time period, $ET_n$ is ET of an n-th time period, $T_n$ is T of the n-th time period, $Pre_n$ is Pre of the n-th time period, and $Rad_n$ is Rad of the n-th time period.

Compared with the prior arts, the present disclosure has the following beneficial effects: in the present disclosure, the phenological difference of the relationship of remote-sensing information, climatic information and grain protein content is taken into account comprehensively, and pixel-wise phenology matching and hierarchical linear model are introduced, such that with key environmental factors as difference factors of the regional grain protein model, a nested model of nationwide grain protein content prediction is constructed so as to provide a winter wheat grain protein content prediction model with high accuracy, wide application scope, and good generality.

DETAILED DESCRIPTIONS OF EMBODIMENTS

In order to make the objects, technical solutions and advantages of the present disclosure clearer, the technical solutions of the present disclosure will be fully and clearly described below. Apparently, the embodiments described herein are only some embodiments of the present disclosure rather than all embodiments. All other embodiments obtained by those skilled in the arts based on the embodiments of the present disclosure without carrying out creative work shall fall within the scope of protection of the present disclosure.

The FIGURE is an operational flow of predicting a winter wheat grain protein content at a provincial-scale, according to at least one embodiment of the subject disclosure. The operation flow provides a provincial-scale prediction method of a winter wheat grain protein content. In at least some embodiments, the provincial-scale prediction method of the winter wheat grain protein content includes obtaining crop canopy spectral information, downloading four types of data of ET, Rad, T and Pre, performing feature selection, selecting a vegetation index with a strongest correlation with grain protein, summing up climate factors, and predicting protein content.

There is provided a provincial-scale prediction method of a winter wheat grain protein content, which includes the following steps:
  at step S1, obtaining crop canopy spectral information of different spatial resolutions and spectral resolutions during a wheat growth period, performing preprocessing on the spectral information, performing radiometric calibration, atmospheric correction and orthorectification based on satellite image data, and performing ratio conversion on ground canopy hyperspectra based on a reference white board of a target reflection intensity and a known reflectance to obtain a canopy reflectance;
  at step S2, downloading four types of data of three months prior to a harvest period: daily evapotranspiration ET, radiation Rad, temperature T, and precipitation Pre, performing projection transformation on the four types of data to obtain raster data consistent with projection of the satellite image data in the step S1;
  at step S3, performing feature selection based on pixel-wise phenology matching method, wherein the feature selection comprises selecting meteorological modeling feature and remote-sensing modeling feature;
  at step S4, calculating, pixel by pixel, a maximal value of a spectral vegetation index within 90 days of each pixel maturity period, and selecting a vegetation index VI most highly correlated with the grain protein content for correlation analysis;
  at step S5, selecting, pixel by pixel, climatic factors of three time periods prior to the maturity period for summation, wherein there are a total of 12 climatic factors which are components of the daily evapotranspiration ET, radiation Rad, temperature T, and precipitation Pre in respective three time periods;
using a summation result as a climatic feature of a nation-wide wheat grain protein content prediction model;
  at step S6, constructing a hierarchical linear model to perform prediction on the winter wheat grain protein content.

The step S3 includes the following steps:
  at step S3.1, obtaining a phenological data set of nation-wide wheat, matching the phonological data set with the raster data, dating forward three periods with each containing 30 days from the day of year of each pixel maturity period and within a total period of 90 days prior to the maturity period, with an interval of 30 days, calculating a cumulative value of each meteorological variable to obtain three cumulative values denoted respectively as T1, T2 and T3 and using T1, T2 and T3 as meteorological modeling features;
  at step S3.2, selecting a maximal value of a remote-sensing variable of these 90 days as remote-sensing modeling feature.

The step S6 includes the followings:
a first layer of the hierarchical linear model is a linear model of grain protein content GPC and VI:

$$GPC = \beta_o + \beta_1 \times VI + r;$$

wherein GPC is a grain protein content, r is a residual term of a first-layer model, $\beta_0$ is an intercept of the first-layer model, $\beta_1$ is a regression coefficient of the first-layer model.

The step S6 includes the followings:
values of the intercept and the regression coefficient are calculated by a second layer:

$$\beta_i = \gamma_{m0} + \sum_1^n (\gamma_{mn1} \times ET_n) + \sum_1^n (\gamma_{mn2} \times T_n) + \sum_1^n (\gamma_{mn3} \times Pre_n) + \sum_1^n (\gamma_{mn4} \times Rad_n) + \mu;$$

wherein $\beta_i$ is a value of the intercept or the regression coefficient, and i=0 or 1, $\gamma_{m0}$ is an intercept of a second-layer model, $\gamma_{mn1}$, $\gamma_{mn2}$, $\gamma_{mn3}$, $\gamma_{mn4}$ are regression coefficients of the second-layer model respectively, μ is a residual term of the second-layer model, n is a time period, $ET_n$ is ET of an n-th time period, $T_n$ is T of the n-th time period, $Pre_n$ is Pre of the n-th time period, and $Rad_n$ is Rad of the n-th time period.

The background technical solutions in the related arts of the present disclosure have the following major defects: the empirical model and the quantitative model for protein content remote-sensing prediction are easy to operate and implement but have poor mechanistic interpretability and large deviation in the nationwide extended application process. Due to the problems of mechanistic simulation of the crop growth model, assimilation algorithm, and point-plane extension operation efficiency and the like, the crop growth model and the grain protein content remote-sensing prediction model based on remote-sensing information assimilation are greatly limited in their regional extension applications. For the semi-mechanistic model of grain protein content based on remote-sensing information and ecological factors, with the ecological factors as independent variables, modeling is performed on the grain protein content and likewise, there are the problems of poor interpretability of the ecological factors for protein composition mechanism and ease of generation of prediction deviation. In the simplified model of the operation mechanism of nitrogen element, many simplification coefficients are related with crop varieties and have variety dependence, and the ecological factors are mostly the environmental factors of a filling period and further, the protein content prediction timeliness is still problematic. Affected by many factors such as climate, terrain and cultivation management conditions and the like, the wheat has complex phenological characteristics such as overlap, time lag and mutation in the nationwide complex geographical scenarios. The conventional selection mechanism of modeling features cannot satisfy the accurate prediction of the grain protein content under a large-range phenological difference.

The object of the present disclosure is to consider key environmental factors resulting in the large-range difference of the grain protein remote-sensing prediction models, dig up pixel-wise winter wheat key phenological information matching rule and introduce the hierarchical linear model to realize correction on the differences of nationwide grain protein models based on the key environmental factors, so as to provide a winter wheat grain protein content prediction model with high accuracy, wide application scope, and good generality.

In the present disclosure, the data of three months prior to the harvest period is downloaded from a field weather station, and feature selection is performed based on pixel-wise phenology matching method. Since the final protein hierarchical linear model is also affected by other environmental factors and the like, a vegetation index having the highest significance and correlation with the protein content is preferably selected to perform further construction of the hierarchical linear model.

The determination of the coefficient of each layer of the hierarchical linear model can be calculated by HLM software. A grain protein content prediction model constructed by an optimal enhanced vegetation index (EVI) is selected to obtain a grain protein content prediction value. The test shows that the hierarchical linear model of grain protein content constructed by coupling remote-sensing information with the environmental factors can greatly improve the prediction accuracy of grain protein content as compared with the conventional methods, and its nationwide prediction has higher stability. During the construction process of the grain protein content model, considering the large-range phenology difference, the hierarchical prediction model of grain protein content is constructed respectively based on preferred optimal vegetation indexes. Then, further selection is performed on the climatic data by the measured verification data, so as to finally select an optimal grain protein prediction model, and thus realize nationwide winter wheat grain protein remote-sensing prediction based on pixel-wise phenology matching method.

The above embodiments are used only to describe the technical solutions of the present disclosure rather than to limit the present disclosure. Although the present disclosure has been detailed by referring to the preceding embodiments, persons of ordinary skill in the arts should understand that they can still make modifications to the technical solutions recorded in the above embodiments or make equivalent replacements to part or all of the technical features and such modifications or replacements do not cause the corresponding technical solutions to depart from the scope of protection of the technical solutions of the embodiments of the present disclosure.

The invention claimed is:

1. A provincial-scale prediction method of a winter wheat grain protein content, comprising:
   at step S1, obtaining crop canopy spectral information of different spatial resolutions and spectral resolutions during a wheat growth period, performing preprocessing on the spectral information, performing radiometric calibration, atmospheric correction and orthorectification based on satellite image data, and performing ratio conversion on ground canopy hyperspectra based on a reference white board of a target reflection intensity and a known reflectance to obtain a canopy reflectance;
   at step S2, downloading four types of data of three months prior to a harvest period: daily evapotranspiration ET, radiation Rad, temperature T, and precipitation Pre, performing projection transformation on the four types of data to obtain raster data consistent with projection of the satellite image data in the step S1, wherein the data of three months prior to the harvest period is downloaded from a field weather station;
   at step S3, performing feature selection based on pixel-wise phenology matching method, wherein the feature selection comprises selecting meteorological modeling feature and remote-sensing modeling feature;
   at step S4, calculating, pixel by pixel, a maximal value of a spectral vegetation index in the satellite image data within 90 days of each pixel maturity period for correlation analysis, and selecting a vegetation index VI most highly correlated with the grain protein content;
   at step S5, selecting, pixel by pixel, climatic factors of three time periods prior to the maturity period for summation, the pixel-wise selection of the climatic factors uses the raster data consistent with the projection of the satellite image data in step S1, wherein there are a total of 12 meteorological variables which are components of the daily evapotranspiration ET, radiation Rad, temperature T, and precipitation Pre in respective three time periods;
   summing each ET result of the daily evapotranspiration ET within the three time periods to obtain an ET sum result, summing each Rad result of the radiation Rad within the three time periods to obtain a Rad sum result, summing each T result of the temperature T within the three time periods to obtain a T sum result, summing each Pre result of the precipitation Pre within the three time periods to obtain a Pre sum result, and using the ET sum result, the Rad sum result, the T sum result, and the Pre sum result as climatic features;

at step S6, constructing a hierarchical linear model to perform prediction on the winter wheat grain protein content;

values of an intercept and a regression coefficient are calculated by a second layer:

$$\beta_i = \gamma_{m0} + \sum_{1}^{n}(\gamma_{mn1} \times ET_n) + \sum_{1}^{n}(\gamma_{mn2} \times T_n) + \sum_{1}^{n}(\gamma_{mn3} \times Pre_n) + \sum_{1}^{n}(\gamma_{mn4} \times Rad_n) + \mu;$$

wherein $\beta_i$ is a value of the intercept or the regression coefficient, and i=0 or 1, $\gamma_{m0}$ is an intercept of a second-layer model, $\gamma_{mn1}$; $\gamma_{mn2}$, $\gamma_{mn3}$, $\gamma_{mn4}$ are regression coefficients of the second-layer model respectively, u is a residual term of the second-layer model, n is a time period, $ET_n$ is ET of an n-th time period, $T_n$ is T of the n-th time period, $Pre_n$ is Pre of the n-th time period, and $Rad_n$ is Rad of the n-th time period; and the step S3 comprises:

at step S3.1, obtaining a phenological data set of nationwide wheat, matching the phenological data set with the raster data, dating forward three periods with each containing 30 days from the day of year of each pixel maturity period and within a total period of 90 days prior to the maturity period, with an interval of 30 days, calculating a cumulative value of each meteorological variable to obtain three cumulative values denoted respectively as T1, T2 and T3 and using T1, T2 and T3 as meteorological modeling features; and at step S3.2, selecting a maximal value of a remote-sensing variable of these 90 days as remote-sensing modeling feature.

2. The provincial-scale prediction method of claim 1, wherein the step S6 comprises the followings:

a first layer of the hierarchical linear model is a linear model of grain protein content GPC and VI:

$$GPC = \beta_o + \beta_1 \times VI + r;$$

wherein GPC is a grain protein content, r is a residual term of a first-layer model, $\beta_o$ is an intercept of the first-layer model, $\beta_1$ is a regression coefficient of the first-layer model.

* * * * *